United States Patent
Yang

(10) Patent No.: US 8,193,720 B2
(45) Date of Patent: Jun. 5, 2012

(54) ELECTRODELESS LAMP PROTECTING DEVICE

(76) Inventor: Chih-Chiang Yang, Hsinchu (TW)

(*) Notice: Subject to any disclaimer, the term of this patent is extended or adjusted under 35 U.S.C. 154(b) by 291 days.

(21) Appl. No.: 12/724,630

(22) Filed: Mar. 16, 2010

(65) Prior Publication Data

US 2011/0227483 A1  Sep. 22, 2011

(51) Int. Cl.
*H05B 41/16* (2006.01)

(52) U.S. Cl. ........ 315/248; 315/224; 315/291; 315/307; 315/39.53; 330/298; 330/297; 330/291

(58) Field of Classification Search .......... 315/248, 315/246, 120, 39.53, 224, 283, 285, 291, 315/307; 330/260, 271, 291, 195, 297, 298
See application file for complete search history.

(56) References Cited

U.S. PATENT DOCUMENTS

| 5,541,482 | A | * | 7/1996 | Siao | 315/248 |
| 5,977,725 | A | * | 11/1999 | Miyazaki et al. | 315/291 |
| 6,313,587 | B1 | * | 11/2001 | MacLennan et al. | 315/248 |
| 6,518,703 | B1 | * | 2/2003 | Hochi et al. | 315/39 |
| 8,084,955 | B2 | * | 12/2011 | Ralston et al. | 315/248 |

* cited by examiner

*Primary Examiner* — Haiss Philogene
(74) *Attorney, Agent, or Firm* — Jackson IPG, PLLC; Demian K. Jackson

(57) ABSTRACT

An electrodeless lamp protecting device installed between an electrodeless lamp and a power source comprises a substrate having a feedback signal input module, a signal level determination module and a protection signal output module installed on the substrate. A signal of the power source is transmitted from the feedback signal input module to the signal level determination module, and the signal serves as a reference for an output signal of the protection signal output module, such that the electrodeless lamp has an automatic protection function upon the receipt of an abnormal signal.

6 Claims, 5 Drawing Sheets

ELECTRODELESS LAMP PROTECTING DEVICE

BACKGROUND OF THE INVENTION

1. Field of the Invention

The present invention relates to an improved electrodeless lamp protecting device, and more particularly to a protecting device providing a protection function to the electrodeless lamp automatically.

2. Description of the Related Art

Illumination devices are generally used for providing stable illuminations, and fluorescent lamps, mercury lamps, and electronic power-saving lamps are introduced to the market as related technologies advance. With the wave filter, rectification, frequency inversion, start, and even control/protect/preheat/dim functions, a stable current can be provided to a lamp.

Since the technology advances, related manufacturers have developed an electrodeless lamp that applies the principle of electromagnetic induction and builds a magnetic core in the internal structure of the lamp to form an induced current. Since the electrodeless lamp does not come with any electrode to convert external electric energy into the energy required for the internal operation of the lamp, the lamp is called "electrodeless lamp". The electrodeless lamp produces an AC magnetic field and generates the induced current of the lamp according to a changing magnetic field, such that a mixed vapor of low-voltage mercury and inert gas can discharge electricity which is converted into visible light through a phosphor.

Generally, a power source is supplied and driven mainly by a procedure including the steps of: converting the voltage of an alternate current (AC) by a transformer; introducing the AC as a unidirectional pulse wave by a bridge rectification circuit; reducing a ripple by a filter capacitor or a choke coil to form a DC power source with a driving force required by an amplifier circuit; and installing a voltage stabilizing circuit if a more stable voltage is needed.

However, the aforementioned electrodeless lamp comes with a specification, a volume and a type different from those of the conventional lamps, and thus its required output power will be different, and manufacturers have to provide a driver with different powers to operate with a driver circuit to meet different power requirements, and also have to change the testing, manufacturing, and supply procedures frequently. As a result, a higher cost will be incurred.

To protect the electronic devices installed in the electrodeless lamp, electronic devices having a protection function are generally added, but the electronic devices having the protection function installed in the conventional electrodeless lamp are usually installed in a scattered manner as shown in FIG. 1, and a control device 1 of the electrodeless lamp includes a plurality of electronic devices 11 installed on a circuit board 10, and a plurality of electronic devices 12 having the protection function are also installed and scattered on the circuit board 10. However, the safety specification at different positions varies, and thus it is necessary to rework these different electronic devices 12, and thus incurring a more time-consuming and effort process.

SUMMARY OF THE INVENTION

In view of the shortcomings of the prior art, the present invention provides an electrodeless lamp protecting device.

To achieve the aforementioned objective, the protecting device of the invention is installed between an electrodeless lamp and a power source, and the protecting device comprises: a substrate having a feedback signal input module, a signal level determination module and a protection signal output module installed on the substrate. A signal of the power source is transmitted from the feedback signal input module to the signal level determination module, and the signal serves as a reference for an output signal of the protection signal output module. If an input signal drives the protecting device to produce a protection mechanism, then the protecting device will stop the normal operation of the electrodeless lamp. If the input signal is insufficient to drive the protecting device to produce the protection mechanism, then the protecting device will not interfere with the normal operation of the electrodeless lamp, such that the electrodeless lamp can be lit normally, as well as providing an automatic protection function upon the receipt of an abnormal signal.

In addition, each module of the protecting device of the invention is installed on the same substrate to facilitate its installation, removal or maintenance to different electrodeless lamps. To meet the installation requirement of different countries (having different voltages and safety regulations), the present invention provides a protecting device that can be configured in various different voltages and specifications quickly.

DETAILED DESCRIPTION OF THE PREFERRED EMBODIMENTS

The technical characteristics of the present invention will become apparent with the detailed description of the preferred embodiments and the illustration of the related drawings.

Figure 1:
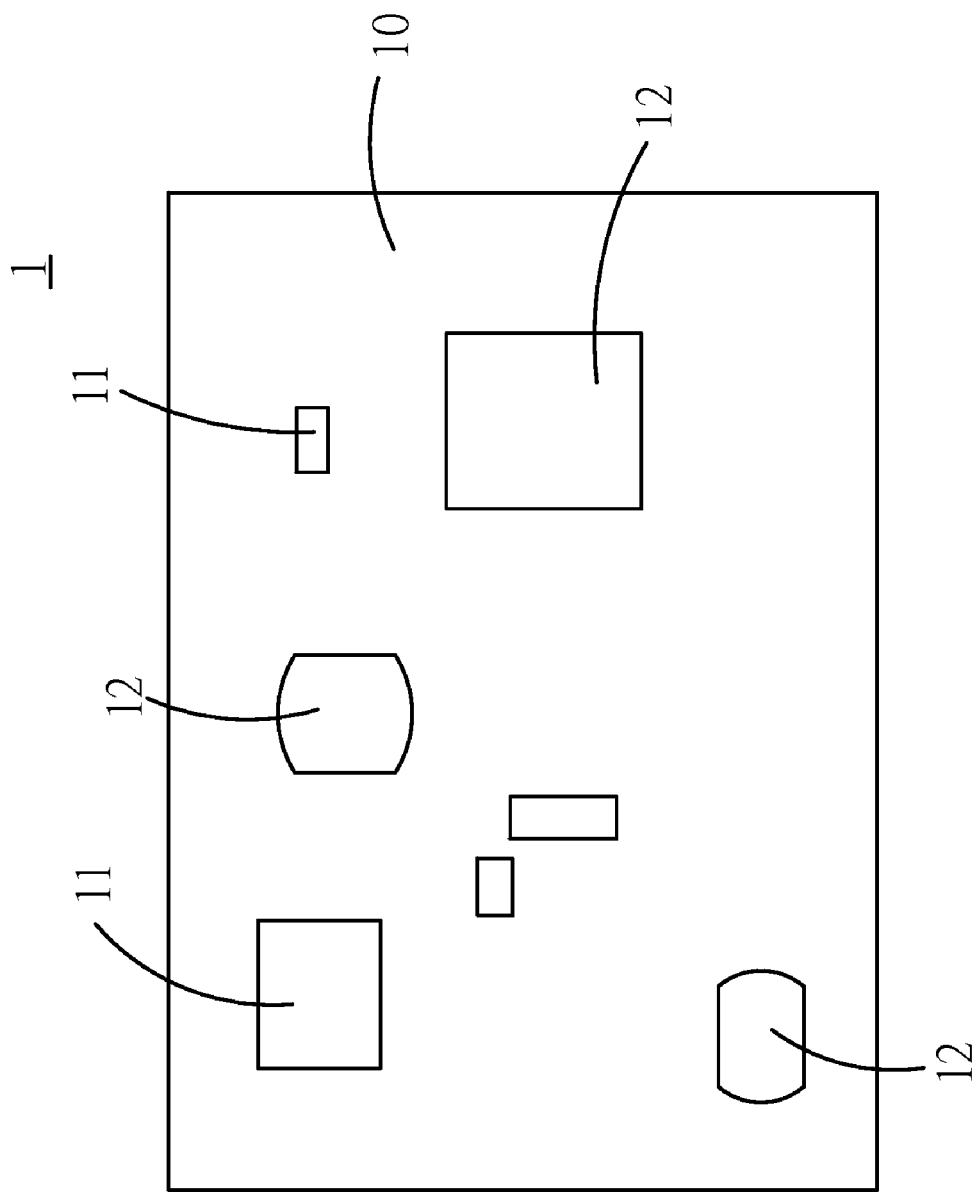
FIG. 1 is a perspective view of a conventional electrodeless lamp control device.
Figure 2:
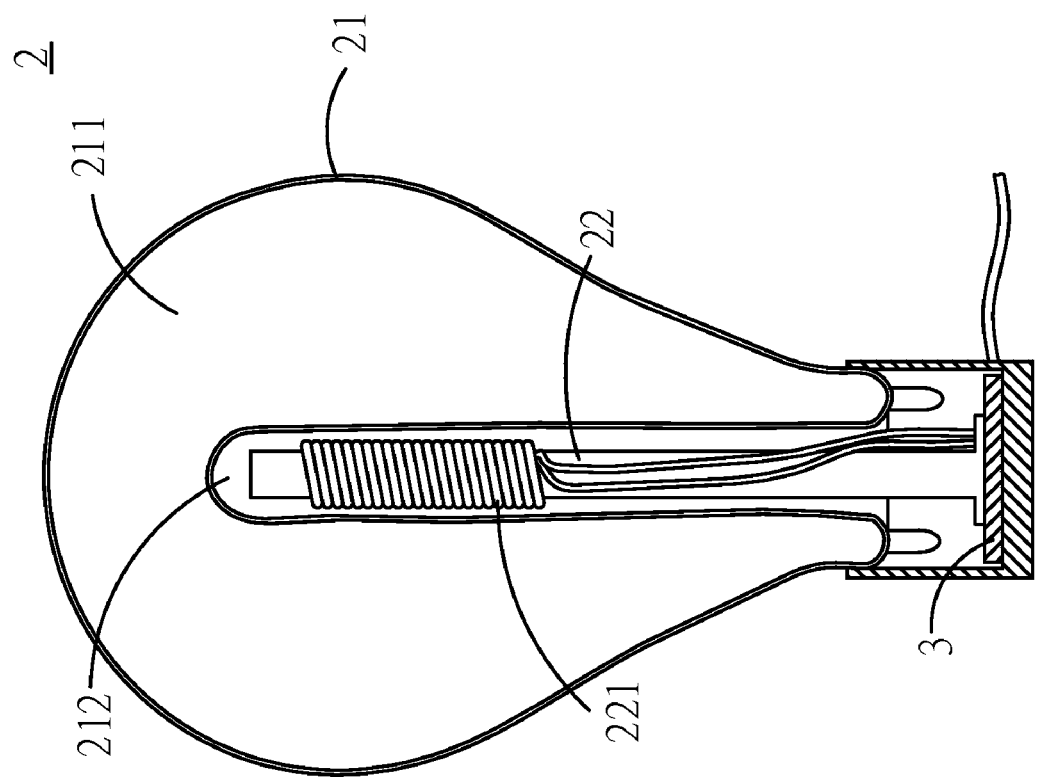
FIG. 2 is a schematic view of an electrodeless lamp in accordance with the present invention.

With reference to FIG. 2 for an electrodeless lamp protecting device of the present invention, the protecting device is installed between an electrodeless lamp and a power source, and the electrodeless lamp 2 includes a bulb 21 having an internal sealed space 211 filled with an inert gas and a coupler 22 wound around by a magnetic coil 221, wherein the bulb 21 includes a containing space 212 isolated from the internal sealed space 211 and provided for installing the coupler 22, and the coupler 22 has a conductive wire (not shown in the figure) of the magnetic coil 221 coupled to the power source through the protecting device.

Figure 3:
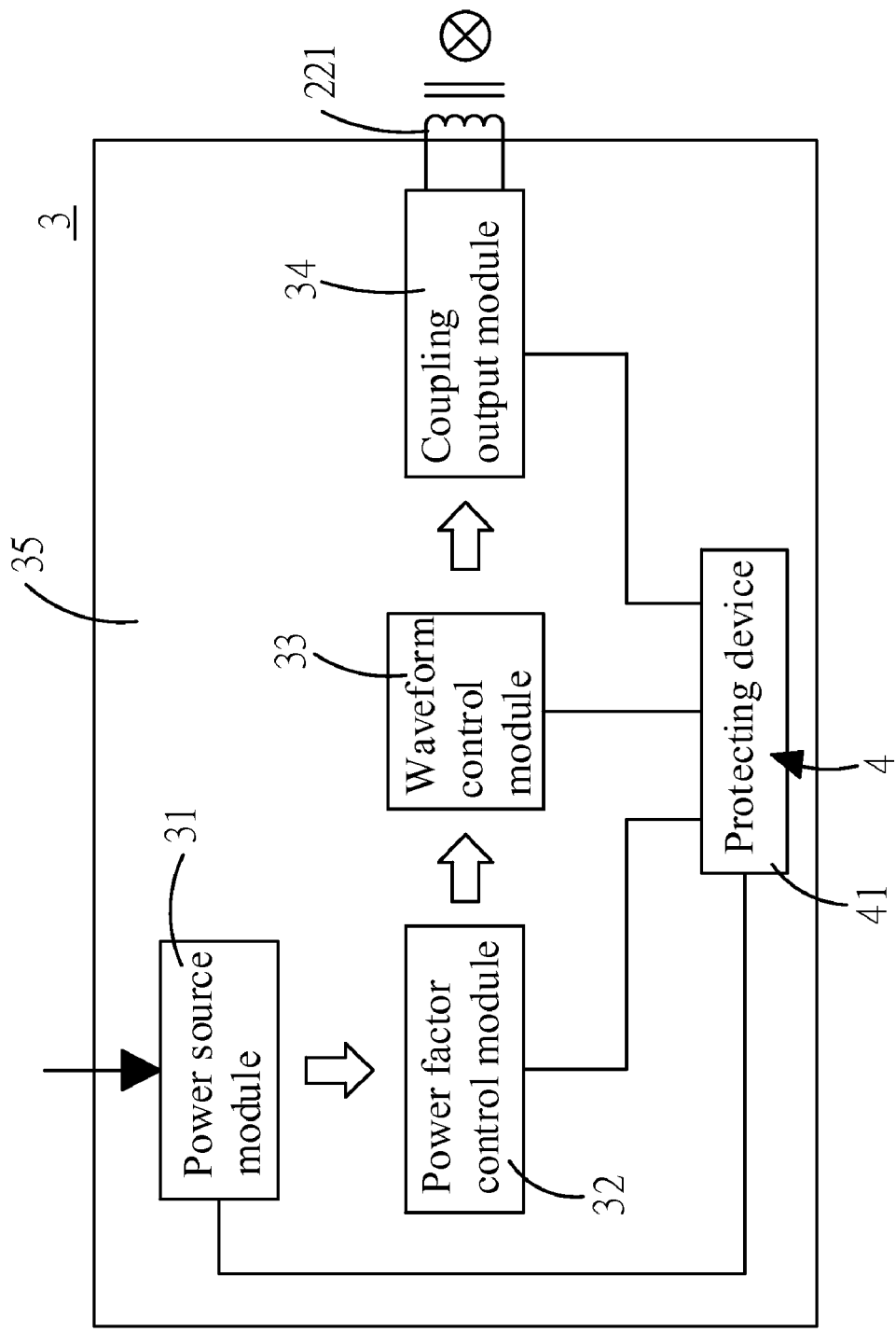
FIG. 3 is a schematic view of a control system in accordance with the present invention.
Figure 4:
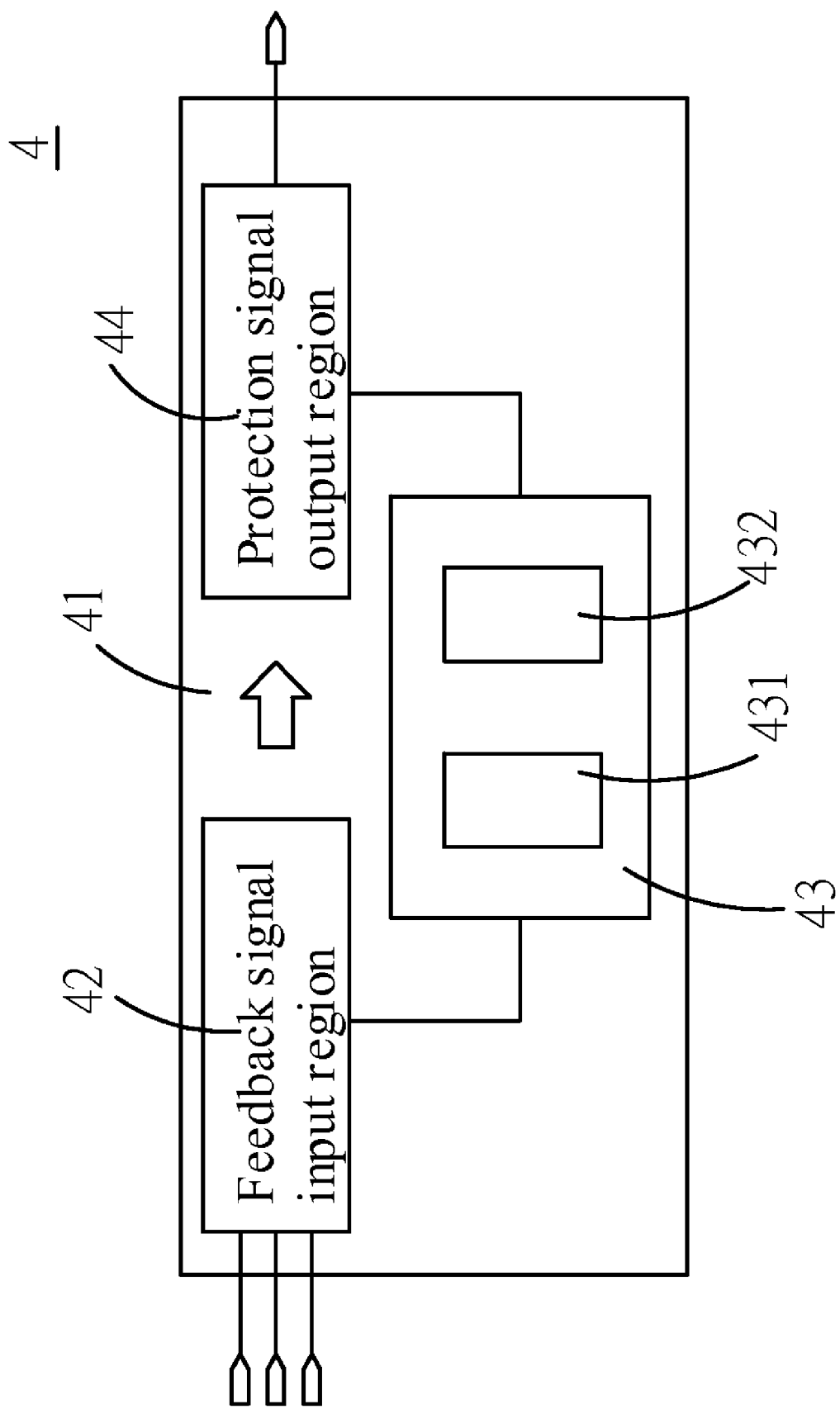
FIG. 4 is a schematic view of a protecting device in accordance with the present invention.

The electrodeless lamp 2 further includes a control system 3, which can be a circuit module 35 installed in the electrodeless lamp 2, or installed outside the electrodeless lamp as shown in FIG. 2, and the control system 3 includes a power source module 31, a power factor control module 32, a waveform module 33, and a coupling output module 34 as shown in FIG. 3, wherein the coupling output module 34 is coupled to a conductive wire (not shown in the figure) of the magnetic coil 221 in the electrodeless lamp.

The present invention is characterized in that the control system includes a modular protecting device as shown in FIG.

4, and the protecting device 4 includes a substrate 41 (which can be a circuit board), having a feedback signal input module 42, a signal level determination module 43 and a protection signal output module 44 installed on the substrate 41, wherein the feedback signal input module 42 is provided for receiving a specific input signal, and the signal level determination module 43 is coupled to the feedback signal input module 42 for receiving the input signal, and the signal level determination module 43 further includes a database 431 and a comparing element 432, and the database 431 includes waveform data and power data of the electrodeless lamp pre-stored into the database 431.

Figure 5:
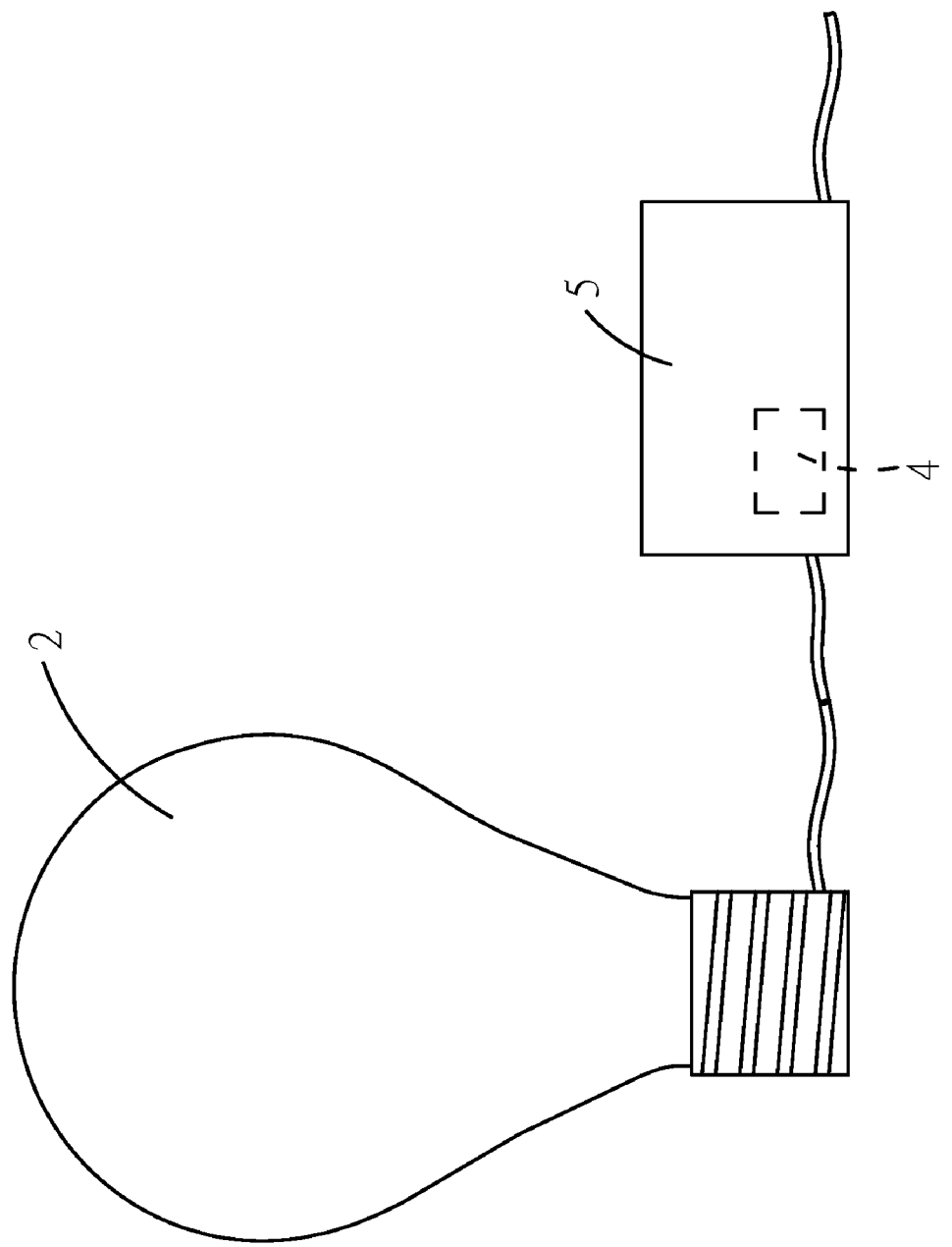
FIG. 5 is a schematic view of another protecting device in accordance with the present invention.

The protecting device 4 is installed in the control system 3 through the substrate 41 and the protecting device 4 is coupled to each of the aforementioned modules 31, 32, 33, 34 of the control system as shown in FIG. 3. Of course, the protecting device 4 can be installed in an electronic stabler 5 which is installed and coupled to the electrodeless lamp 2 as shown in FIG. 5.

When the electrodeless lamp is used, an inputted power is processed by the power source module 31 and then supplied to the feedback signal input module 42 of the protecting device, and the feedback signal input module 42 is provided for receiving an input signal intended to be transmitted to the electrodeless lamp and transmitting the input signal to the signal level determination module 43, and the signal level determination module 43 compares the input signal with the data stored in the database to generate a determination signal, and the determination signal is transmitted to the protection signal output module 44, such that the protection signal output module 44 can output the determination signal to the coupling output module 34.

For instance, if the inputted power source is converted into an input signal with a specific waveform, and the input signal of the specific waveform is different from the waveform data stored in the database, the signal level determination module will generate a determination signal, and the determination signal will drive the protecting device to produce a protection mechanism, such that the power source cannot be supplied to the magnetic coil or converted into an electromagnetic wave, and the electrodeless lamp will not be lit. The signal level determination module further includes a warning element coupled to the signal level determination module, such that the warning element can determine whether or not to generate the warning signal according to the determination signal. If the determination signal drives the protecting device to produce the protection mechanism, the warning element will generate the warning signal to remind users, wherein the warning element is a light source or a buzzer used for warning the users.

On the other hand, if the inputted power source is converted into an input signal of a specific waveform, and the input signal of the specific waveform is the same as the waveform data stored in the database, the signal level determination module will generate a determination signal, and the determination signal will not drive the protecting device to produce the protection mechanism, such that the power source is supplied to the magnetic coil and converted into an electromagnetic wave to be radiated to the sealed space of the bulb, and acted on the inert gas to produce visible light, so as to light up the electrodeless lamp.

Therefore, the present invention uses a specific input signal as a reference for the output signal of the protection signal output module of the protecting device. If the input signal drives the protecting device to produce the protection mechanism, then the protecting device will stop the normal operation of the electrodeless lamp. If the input signal is insufficient to drive the protecting device to produce the protection mechanism, then the protecting device will not interfere with the normal operation of the electrodeless lamp, so that the electrodeless lamp can be lit, while achieving the effect of providing an automatic protection function upon the receipt of an abnormal signal.

It is noteworthy to point out that the present invention modularizes the protecting device, and each module is installed on the same substrate in order to facilitate its installation onto different electrodeless lamps and allow independent exchange, repair and maintenance. The protecting device of the invention also can meet the requirements of different countries (since the voltage and safety regulations of the power supply are different in different countries) and provide a quick configuration for various different countries.

The present invention improves over the prior art and complies with patent application requirements, and thus is duly filed for the patent application. While the invention has been described by device of specific embodiments, numerous modifications and variations could be made thereto by those generally skilled in the art without departing from the scope and spirit of the invention set forth in the claims.

What is claimed is:

1. An electrodeless lamp protecting device, installed between an electrodeless lamp and a power source, comprising:
a feedback signal input module, for receiving an input signal intended to be transmitted to the electrodeless lamp;
a signal level determination module, coupled to the feedback signal input module, for receiving and determining the input signal, and generating a determination signal;
a protection signal output module, coupled to the signal level determination module, for receiving the determination signal, and outputting the determination signal to determine whether or not to light up the electrodeless lamp; and
a substrate, provided for installing the feedback signal input module, the signal level determination module and the protection signal output module thereon.

2. The electrodeless lamp protecting device of claim 1, wherein the electrodeless lamp includes a bulb having an internal space filled with an inert gas and a coupler wound with a magnetic coil, and the bulb includes a containing space isolated from the internal space and provided for installing the coupler, and the coupler is coupled to a power source through a conductive wire of a magnetic coil.

3. The electrodeless lamp protecting device of claim 2, wherein the electrodeless lamp further includes a control system, and the control system includes a power source module, a power factor control module, a waveform module and a coupling output module, and the protecting device is coupled to each module of the control system, and the protection signal output module transmits the determination signal to the coupling output module, and the coupling output module is coupled by a conductive wire of a magnetic coil in the electrodeless lamp.

4. The electrodeless lamp protecting device of claim 1, wherein the signal level determination module further includes a database and a comparing element, and waveform data and power data of electrodeless lamp are pre-stored in the database, and the comparing element compares the input signal with the data of the database to generate a determination signal.

5. The electrodeless lamp protecting device of claim 1, wherein the signal level determination module is coupled to a warning element for generating a warning signal according to the determination signal.

6. The electrodeless lamp protecting device of claim 5, wherein the warning element is a light source or a buzzer.

* * * * *